United States Patent [19]

Srivastava

[11] Patent Number: 5,273,681
[45] Date of Patent: Dec. 28, 1993

[54] PRASEODYMIUM-DOPED LUMINESCENT COMPOSITIONS

[75] Inventor: Alok M. Srivastava, Schenectady, N.Y.

[73] Assignee: General Electric Company, Schenectady, N.Y.

[21] Appl. No.: 902,169

[22] Filed: Jun. 22, 1992

[51] Int. Cl.$^5$ .............................................. C09K 11/80
[52] U.S. Cl. ............................................. 252/301.4 R
[58] Field of Search ................................ 252/301.4 R

[56] References Cited

FOREIGN PATENT DOCUMENTS

| | | | |
|---|---|---|---|
| 161820 | 11/1985 | European Pat. Off. | 252/301.4 R |
| 2327302 | 6/1977 | France | 252/301.4 R |
| 47-7364 | 3/1972 | Japan | 252/301.4 R |
| 51-68484 | 6/1976 | Japan | 252/301.4 R |
| 1055099 | 1/1967 | United Kingdom | 252/301.4 R |

OTHER PUBLICATIONS

Ropp "J. of the Electrochem. Soc.", vol. 11, No. 3, pp. 311–317, 1964.
Hooge "J. Chem. Phys.", 45(12), pp. 4504–4509, 1966.
Ozawa et al "Jap. J. Appl. Phys.", vol. 7, No. 11, pp. 1354–1360, 1968.
Porotnikov et al "Chem. Abstracts", vol. 100, 1984, 42233s.

*Primary Examiner*—Jack Cooper
*Attorney, Agent, or Firm*—William H. Pittman

[57] ABSTRACT

Phosphorescent compositions of the formula $Pr_xSrM_{1-x}AlO_4$, wherein M is lanthanum or gadolinium and x is in the range of about 0.025–0.075, are prepared by the reaction of appropriate proportions of aluminum nitrate, strontium carbonate, gadolinium(III) oxide or lanthanum(III) oxide and a praseodymium oxide. They emit light in the red and green regions of the visible spectrum.

5 Claims, No Drawings

PRASEODYMIUM-DOPED LUMINESCENT COMPOSITIONS

This invention relates to new luminescent compositions of matter, useful as phosphors.

Phosphors are employed in such diverse applications as fluorescent lamps, X-ray detection devices including computerized tomography scanners, digital radiography devices and position emission tomography apparatus. Upon excitation by ultraviolet, X-ray or cathode radiation, they release energy in the form of light which may be easily detected. Among the phosphors typically employed is europium-doped yttrium trioxide ($Y_2O_3$).

For many areas of phosphor utilization including medical imaging systems, it is desired to have materials with short primary decay times. It is also often desirable to have available a single phosphor material capable of employment with various types of light detectors. Examples of such detectors are photomultiplier tubes, which typically detect light in the green region of the visible spectrum, and silicon diodes, which detect light in the red region. Thus, emission in both regions would be advantageous. A number of phosphors satisfying these criteria are provided by the present invention.

In one of its aspects, the invention includes luminescent crystalline compositions having the formula $Pr_xSrM_{1-x}AlO_4$, wherein M is lanthanum or gadolinium and x is in the range of about 0.025-0.075, said composition having a tetragonal crystal lattice.

As will be apparent from the above generic formula, the compositions of this invention are praseodymium-doped mixed aluminates of strontium and lanthanum or gadolinium. They may be prepared by the reaction of stoichiometric amounts of a praseodymium oxide such as $Pr_6O_{11}$, strontium carbonate, lanthanum(III) oxide or galodinium(III) oxide and aluminum nitrate, the latter frequently being employed as a hydrate. The reaction takes place upon firing at temperatures of about 9000C or greater, typically conducted in an inert atmosphere such as nitrogen.

The preparation of the compositions of this invention is illustrated by the following examples.

EXAMPLE 1

A mixture of strontium carbonate, lanthanum(III) oxide, $Pr_6O_{11}$ and aluminum nitrate nonahydrate, corresponding to a Pr:Sr:Gd:Al molar ratio of 5:100:95:100, was fired in an atmosphere of 95% nitrogen and 5% hydrogen at 9000° C. for 7 hours, whereby all the praseodymium was reduced to the trivalent state. The resulting powder was ground and heated for 10 hours at 1200°-13000° C.

The product was characterized by its X-ray diffraction pattern which indicated a single-phase tetragonal structure. Upon excitation by ultraviolet radiation, the composition luminesced at 500 nm. (green region), with two peaks in the 600-700 nm. (red) region, and above 700 nm. (infrared region).

EXAMPLE 2

The procedure of Example 1 was repeated, substituting lanthanum(III) oxide on an equimolar basis for the gadolinium(III) oxide. A similar composition was obtained; it was also tetragonal with a=3.697Å and c=12.36Å.

The compositions of this invention, being luminescent in the red and green regions of the visible spectrum, are useful are phosphors in numerous types of lighting structures, medical diagnostic structures and the like, including those enumerated hereinabove. Accordingly, another aspect of the present invention is a phosphorescent article comprising a compound of this invention deposited on a substantially chemically inert support. Said support may be, for example, a material which is also inert to radiation (i.e., a glass envelope in the case of a fluorescent lamp fixture). In the case of a medical imaging apparatus, it may be a light sensing unit such as a photodiode, photomultiplier device or charge-coupled device.

What is claimed is:

1. A luminescent crystalline composition having the formula $Pr_xSrM_{1-x}AlO_4$, wherein M is lanthanum or gadolinium and x is in the range of about 0.025-0.075, said composition having a tetragonal crystal lattice.

2. A composition according to claim 1 wherein M is lanthanum.

3. A composition according to claim 2 wherein x is 0.05.

4. A composition according to claim 1 wherein M is gadolinium.

5. A composition according to claim 4 wherein x is 0.05.